US010640079B2

(12) United States Patent  
Klubach

(10) Patent No.: US 10,640,079 B2  
(45) Date of Patent: May 5, 2020

(54) COVER FOR A STRAP

(71) Applicant: Volkswagen Aktiengesellschaft, Wolfsburg (DE)

(72) Inventor: Julian Klubach, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 19 days.

(21) Appl. No.: 16/165,336

(22) Filed: Oct. 19, 2018

(65) Prior Publication Data

US 2019/0047509 A1 Feb. 14, 2019

Related U.S. Application Data

(63) Continuation of application No. PCT/EP2017/057912, filed on Apr. 4, 2017.

(30) Foreign Application Priority Data

Apr. 19, 2016 (DE) .......................... 10 2016 206 589

(51) Int. Cl.
*B60R 22/18* (2006.01)
*B60R 21/01* (2006.01)
*B60R 22/48* (2006.01)
*B60R 22/00* (2006.01)

(52) U.S. Cl.
CPC .... *B60R 22/18* (2013.01); *B60R 2021/01006* (2013.01); *B60R 2022/006* (2013.01); *B60R 2022/1806* (2013.01); *B60R 2022/4808* (2013.01)

(58) Field of Classification Search
CPC ...................................................... B60R 22/18
USPC .......................................... 297/482; 280/808
See application file for complete search history.

(56) References Cited

U.S. PATENT DOCUMENTS

| 3,743,147 A | | 7/1973 | Wilczynski | |
|---|---|---|---|---|
| 5,201,099 A | * | 4/1993 | Campbell | .............. A44B 11/04 |
| | | | | 24/186 |
| 5,982,048 A | | 11/1999 | Fendt et al. | |
| 7,971,908 B2 | * | 7/2011 | Hathaway | ............... B60R 22/26 |
| | | | | 24/115 F |
| 8,944,468 B2 | * | 2/2015 | Cox | ................... A44B 11/2561 |
| | | | | 280/801.1 |

FOREIGN PATENT DOCUMENTS

| DE | 9416402 U1 | 2/1995 |
|---|---|---|
| DE | 4420114 A1 | 12/1995 |
| DE | 19624199 C1 | 11/1997 |

(Continued)

OTHER PUBLICATIONS

International Search Report dated Jun. 6, 2017 in corresponding application PCT/EP2017/057912.

*Primary Examiner* — Syed A Islam
(74) *Attorney, Agent, or Firm* — Muncy, Geissler, Olds & Lowe, P.C.

(57) ABSTRACT

A cover for a strap, in particular for protecting the strap from mechanical influences, wherein the cover has a body that is designed such that the body has an aperture that is enclosed at least in sections by a wall, via which the cover can be arranged on the strap such that the wall of the body encloses at least sections of the strap in the circumferential direction of the body. A bracket is arranged on the wall of the body in this design.

13 Claims, 4 Drawing Sheets

(56) References Cited

FOREIGN PATENT DOCUMENTS

| | | |
|---|---|---|
| DE | 19740732 A1 | 3/1999 |
| DE | 20200271 U1 | 5/2002 |
| DE | 202006004007 U1 | 8/2006 |
| DE | 102005035867 A1 | 2/2007 |
| DE | 102007029649 A1 | 1/2009 |
| DE | 102008052332 A1 | 4/2010 |
| FR | 3013651 A1 | 5/2015 |
| JP | 2006188203 A | 7/2006 |
| KR | 20110085580 A | 7/2011 |

* cited by examiner ial Application No. PCT/EP2017/057912, which was
filed on Apr. 4, 2017, and which claims priority to German
Patent Application No. 10 2016 206 589.0, which was filed
in Germany on Apr. 19, 2016 and which are both herein
incorporated by reference.

BACKGROUND OF THE INVENTION

Field of the Invention

The present invention relates to a cover for a strap of a
seat belt for a vehicle, in particular for protecting the strap
from mechanical influences. In this design, the cover has a
body that is designed such that said body has an aperture that
is bordered at least in sections by a wall. As a result, the
cover can be arranged on the strap such that the wall of the
body encloses at least sections of the strap in the circumferential direction of the body.

Description of the Background Art

Safety systems, as for example airbag and seat belt
tensioner systems, are present in motor vehicles of all types.
Many of these motor vehicles are also equipped with comfort and convenience systems that work in conjunction with
the safety systems. Included among these are systems for
detecting seat occupancy of passenger seats and for detecting the seat belt buckle status. These systems provide, firstly,
a signal as to whether a person is positioned on a seat, and
secondly, a signal as to whether a seat belt has been fastened
in the belt buckle.

With regard to the use of seat occupant detection, DE 44
20 114 A1, for example, describes an air bag system that is
intended to protect the vehicle occupants in the event of a
frontal or side impact. This air bag system is equipped with
multiple air bags, wherein they are selectively triggered as
a function of the direction and intensity of an impact as
determined by means of acceleration sensors, and also as a
function of the occupancy of a seat by a vehicle occupant.

In the field of seat belt buckle status detection, as DE 196
24 199 C1, which corresponds to U.S. Pat. No. 5,982,048,
describes in presenting the prior art, devices including
micromechanical belt contact switches and even Hall sensors are used to detect seat belt buckle locking, wherein
systems based on Hall sensors are contactless, and thus are
subject to less wear and are more reliable than mechanical
switches.

In both cases, however, signal and power lines in the form
of at least one cable are required, in order firstly to supply
such a seat belt buckle status detection device with energy,
and secondly to deliver the status signals to, e.g., a control
unit. To achieve this, it is necessary to route such a cable
from the region of the belt buckle to the outside.

On this topic, DE 20 2006 004 007 U1 and DE 10 2008
052 332 A1 show a spring arranged on an axis. The spring
in these cases is designed such that sections of it serve to
guide or strain-relieve a cable provided for electrically
connecting the seat belt buckle. This cable in these designs
is routed through the mounting foot that is connected to the
seat belt buckle and serves to fasten the seat belt buckle to
the vehicle body, with the end of this cable terminating in a
connector.

In addition to the possibility of routing the cable through
the mounting foot, solutions exist for arranging this cable
outside the mounting foot after its exit from, e.g., the seat
belt buckle. Such a solution is also employed when the seat
belt buckle is not attached directly to the mounting foot, but
rather through a belt strap. In this case, the cable is generally
routed under a belt strap protector, which serves primarily to
protect the belt strap from mechanical action, as well as
having a mechanical stabilizing action on the flexible belt
strap, which also has advantageous effects, for example,
during the installation of the seat belt buckle or belt strap,
respectively, in the motor vehicle.

The connector attached to a cable is generally secured to
such a mounting foot by means of a connector bracket,
wherein in this case a sheet-metal part of the mounting foot
is normally bent perpendicular to the vehicle body floor to
form a tab. Such a connector bracket is pushed onto this tab,
and the connector attached to the cable is in turn attached to
this connector bracket. Among the disadvantages of the
procedure described above is the need for an additional
connector bracket for attaching the connector and a large
amount of cutting waste for producing the tab in the mounting foot. The large amount of cutting waste here results from
the unavoidable need to taper the material, which in general
has a sheet thickness of more than 3 millimeters, in order to
form the tab, which according to the prior art takes place by
cutting the material to size.

SUMMARY OF THE INVENTION

It is therefore an object of the present invention to
implement a cover such that no additional components are
needed to fasten an element to a mounting base and such that
cutting waste on the mounting base is avoided.

According to an exemplary embodiment of the invention,
a cover for a strap of a seat belt for a vehicle is provided that
serves, in particular, to protect the strap from mechanical
influences. Here, the cover has a body that is designed such
that said body has an aperture that is enclosed at least in
sections by a wall. As a result, the cover can be arranged on
the strap such that the wall of the body encloses at least
sections of the strap in the circumferential direction of the
body. According to the invention, a bracket is also arranged
on the wall of the body.

The strap can be implemented as, for example, a belt
strap, and can serve to attach, e.g., a seat belt buckle of a seat
belt arrangement to a mounting base that is fastened to a
vehicle body in an interlocking and/or frictional or integral
manner.

As a result of the arrangement of the bracket, it is within
the realm of possibility to attach any desired element to this
bracket, and thus above all to largely avoid manufacturing
changes to the mounting base for fastening the seat belt
buckle of the seat belt arrangement to the vehicle body and
to preclude the use of additional components needed for
fastening such an element.

Such an element can be designed as a connector, among
other things.

The body itself need not have a closed circumferential
wall here. Instead, it can be implemented as a blank providing for multiple side pieces, which produce the body
when joined by a fastening element.

The bracket can have an at least approximately rectangular, plate-like basic shape, wherein the thickness of the
bracket is perpendicular to a bracket plane. A basic shape
formed in this way can permit simple manufacture of the
bracket, and also offers a variety of fastening options for
purposes including attaching an element such as a connector
to this bracket.

It proves to be eminently practical when the approximately rectangular and plate-like bracket has an elongated shape, and thus has a longitudinal direction. Due to the elongated shape of the bracket, it can have a greater extent in one spatial direction than in the two remaining spatial directions, which is to say that one of the three edge lengths of the rectangular bracket is significantly longer than the other two of these edge lengths.

For example, the extent or edge length in one of the spatial directions could be at least twice as long as the next-largest extent or edge length in one of the other spatial directions.

An elongated shape of this nature can be advantageous, especially in the positioning of elements such as, e.g., one or more connectors, that are to be fastened to the bracket, in that multiple such elements can be arranged next to one another in the longitudinal direction of the bracket in a simple manner.

The bracket can be arranged on the body of the cover such that the longitudinal direction of the bracket is orthogonal to a center axis of the cover, since this makes possible a compact shape of the cover and, at the same time, high variability in the position of an element, such as one or more connectors, to be attached to the bracket of the cover.

The bracket can have a projection in its longitudinal direction relative to the body, on both sides of the center axis of the cover. As a result, the bracket cannot be limited to the outer dimensions of the body, and can project beyond said body. On this basis, sufficient space can be created on the bracket in the longitudinal direction as necessary to arrange multiple elements, for example connectors.

If the bracket has at least one receptacle, then it is possible to ensure among other things that, for example, an element or elements to be attached to the bracket, as for example one or more connectors, can be fastened to the bracket in a simple manner.

The at least one receptacle can perforate the bracket perpendicular or substantially perpendicular to the bracket plane. In this way, the receptacle would take the form of a simple aperture, by which means it would be possible to ensure simple manufacture of the receptacle, for example. In this case, it would be possible to introduce multiple such receptacles into the bracket, as a result of which an equal number of elements such as connectors could be attached to the bracket.

The bracket can have two receptacles, wherein one receptacle can be located on each side of the center axis of the cover in the region of the projection of the bracket. Receptacles introduced into the bracket in such a way offer the advantage that they are easily accessible due to the symmetrically spaced arrangement of the receptacles, and a potential lack of space arising during an installation of elements, as for example connectors, in the receptacles is minimized to the greatest degree possible.

If, in addition, the surface areas of the bases of at least two receptacles introduced into the bracket differ from one another, this proves to be advantageous. The receptacles can thus be formed in different sizes.

In this case, the surface area of the base of one receptacle introduced into the bracket could be smaller than the surface area of a second receptacle introduced into the bracket, for example.

Moreover, if the receptacles are formed as apertures, then when at least two receptacles are present the openings of these receptacles can differ in terms of size.

On the basis of such different-sized receptacles, elements, for example connectors, of different sizes can profitably be arranged in these receptacles.

Also to be considered especially advantageous is an embodiment of the invention in which a guide is located at the at least one receptacle of the bracket that perforates sections of the bracket in a direction that lies within the bracket plane, as a result of which the receptacle is accessible in this direction. It is thus possible to locate a guide at a receptacle that opens the receptacle—which was initially enclosed by the bracket in the bracket plane—toward the outside in a direction within this bracket plane. As a result, it is possible to introduce, e.g., elements shaped to correspond to a guide, such as connectors, into the receptacle through the guide of the bracket.

A width of the guide in this design can be less than a width of the receptacle.

Moreover, it appears to be very useful when a clear width of the guide decreases toward the receptacle, by which means the guide tapers in this direction. The guide thus represents a sort of V-shaped opening extending toward the receptacle. On account of this design in combination with the design of the receptacle, two arms, as it were, could be formed in the bracket in the region of the receptacle on both sides of the guide. During insertion of an element to be accommodated, for example a connector, these arms could perform a deflection in the direction toward or away from the receptacle and, on the basis of the V-shaped design of the guide, form a sort of barb that advantageously secures an element introduced into the receptacle in its final position in the receptacle.

The bracket can be arranged at one end of the body. The bracket in this case could be arranged with the side of its shortest extent abutting the wall of the body.

In this way, the cover can be produced very advantageously in manufacturing terms in an initially flat construction, wherein, for example, the body would temporarily be implemented as a blank providing for multiple side pieces, which could subsequently be formed into the body and connected by means of a fastening element.

If the cover is implemented as one piece, simple manufacturing of the cover, for example as an injection molded part, can beneficially be ensured in this way.

Furthermore, it has a very beneficial effect when, for example, the cover is made of an elastomer, wherein this could have the advantage, among others, that in the event of any mechanical stress occurring on the bracket, the latter is reversibly bent, for example, thus making it possible to minimize a stress on a connector arranged on the bracket.

If the bracket is connected to the body of the cover by a flexure bearing, then it can be assumed that this can make possible a limited rotary motion of the bracket relative to the body of the cover, by which means the bracket can be oriented in, e.g., multiple rotary positions, and thus requirements for specific positioning of the bracket, for example when there is a lack of space, can be satisfied.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
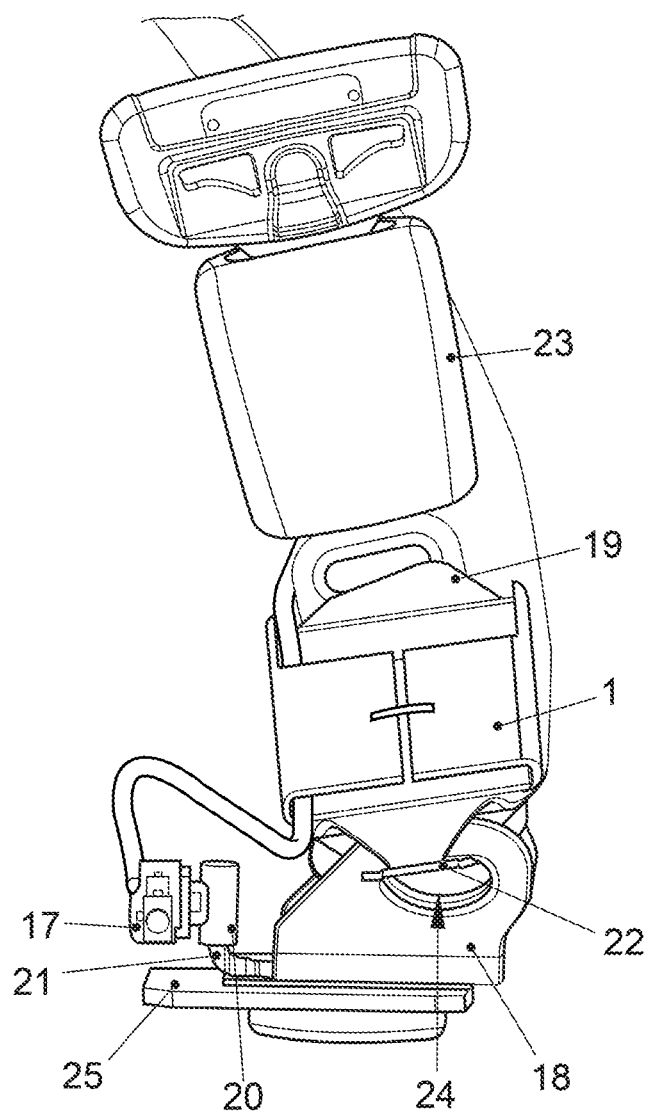
FIG. 1 shows an embodiment of the prior art.

FIG. 1 shows the prior art, in which the cover 1 is pushed onto a strap 19 implemented as a belt strap. The strap 19 serves here to fasten a seat belt buckle 23 to the mounting base 18, which in turn is provided for attachment to the body 25 of a vehicle. By means of a clamp base 22, which engages in an aperture 24 of the mounting base 18, the cover 1 is secured within limits in its position on the strap 19. The mounting base 18 is designed such that it has a tab 21, which is perpendicular to the vehicle body 25 and on which is arranged an element holder 20. An element 17 designed as a connector is fastened to this element holder 20.

Figure 2:
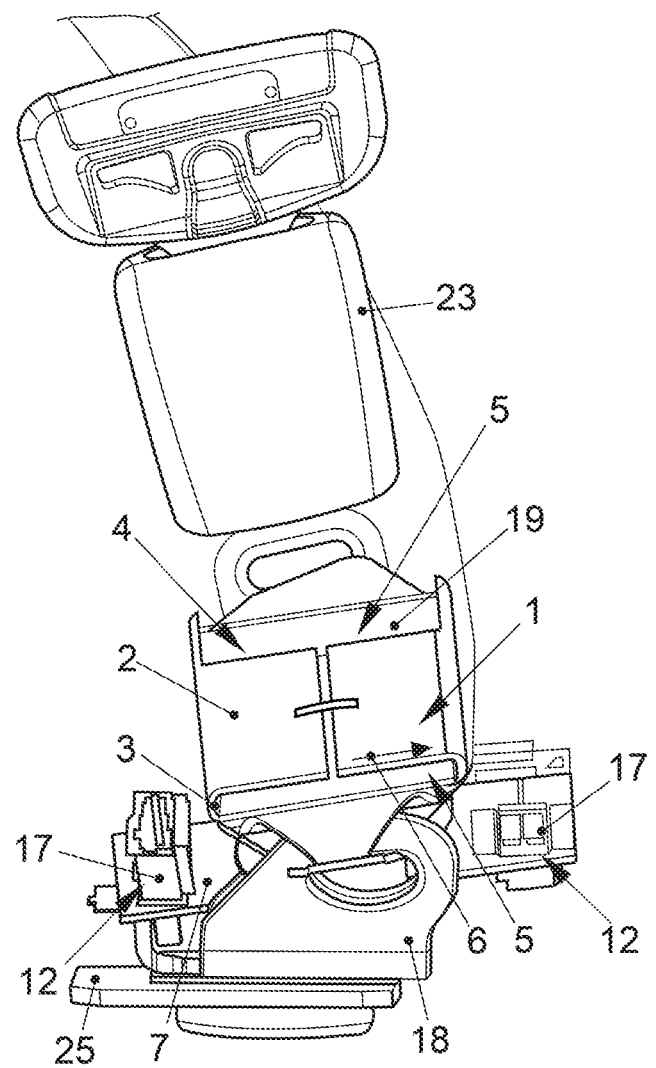
FIG. 2 shows an improvement of the cover according to an exemplary embodiment of the invention.

In FIG. 2, in contrast, an improvement of the cover 1 according to the invention for the strap 19 is shown, which is provided, in particular, for protecting the strap 19 from mechanical influences. The strap 19, designed in this case as a belt strap, serves here in turn to fasten the seat belt buckle 23 to the mounting base 18, wherein the latter is once again provided for attachment to the body 25 of a vehicle. The cover 1 has a body 2 that is designed such that said body 2 has an aperture 4 that is enclosed at least in sections by a wall 3, by which means the cover 1 is arranged on the strap 19 such that the wall 3 of the body 2 encloses at least sections of the strap 19 in the circumferential direction 6 of the body 2. According to the invention, a bracket 7 is arranged on the wall 3 of the body 2 in this case. In this improvement, the bracket 7 has two receptacles 12, each of which serves to fasten one element 17 designed as a connector.

Figure 3:
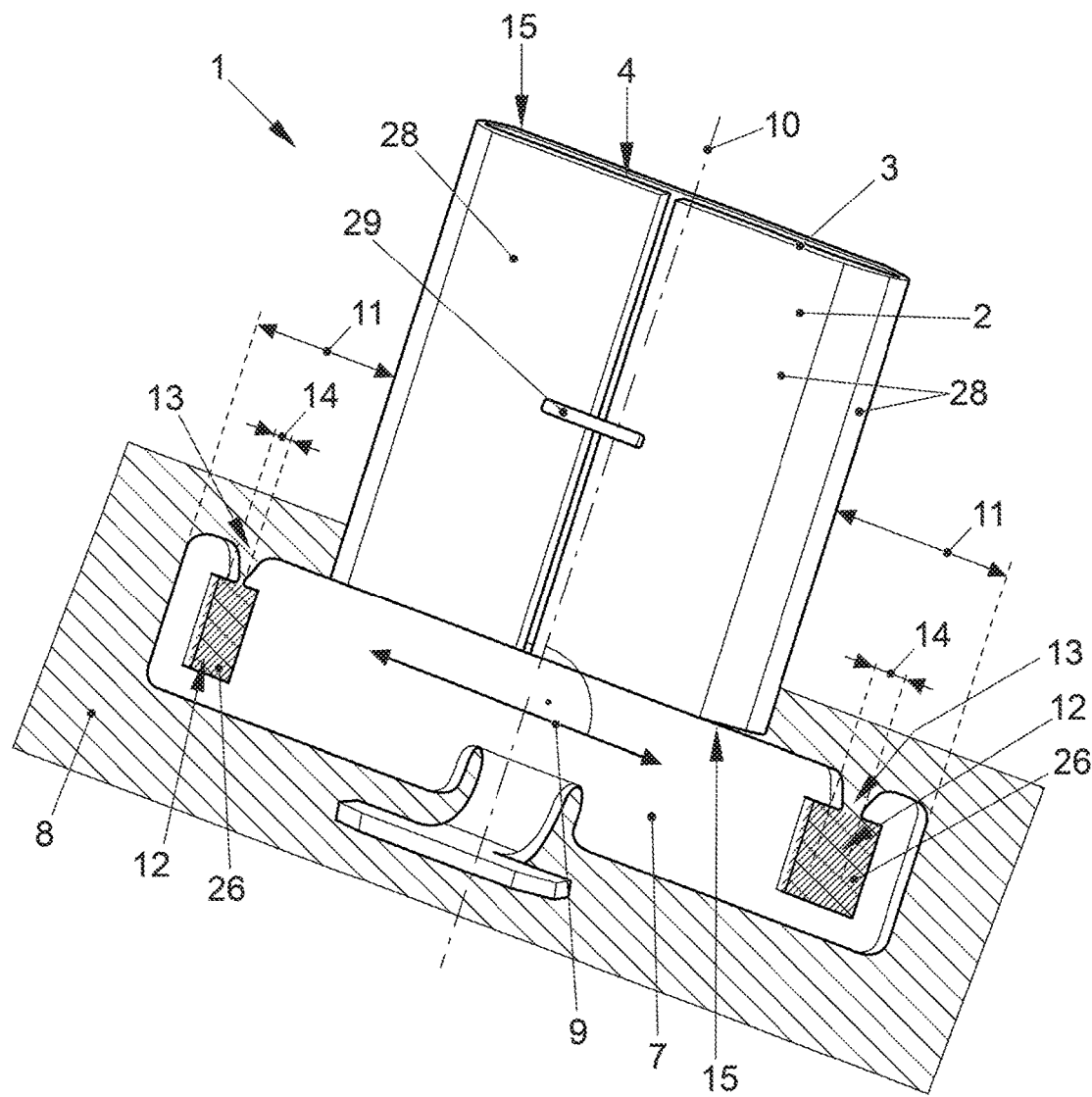
FIG. 3 is a detail view of an improvement of a cover implemented as one piece.

FIG. 3 shows a detail view of an improvement of the cover 1, designed as one piece, for a strap 19 shown in FIG. 2, in particular for protecting said strap 19 from mechanical influences, wherein the cover 1 has a body 2 that is designed such that said body 2 has an aperture 4 that is enclosed at least in sections by a wall 3. In addition, the bracket 7 arranged on the wall 3 of the body 2 has an at least approximately rectangular, plate-like basic shape, wherein the thickness of the bracket 7 is perpendicular to a bracket plane 8. Moreover, the approximately rectangular and plate-like bracket 7 has an elongated shape, and thus has a longitudinal direction 9. The bracket 7 here is arranged on one of the ends 15 of the body 2 such that the longitudinal direction 9 of the bracket 7 is orthogonal to the center axis 10 of the cover 1. The bracket 7 also has a projection 11 in its longitudinal direction 9 relative to the body 2, on both sides of the center axis 10 of the cover 1. In addition, the bracket has 7 two receptacles 12 that differ in the surface areas of their bases 26, wherein one receptacle 12 is located on each side of the center axis 10 of the cover 1 in the region of the projection 11 of the bracket 7, wherein the receptacles 12 perforate the bracket 7 perpendicular to the bracket plane 8. In addition, located at each receptacle 12 is a guide 13 that perforates sections of the bracket 7 in a direction that lies within the bracket plane 8, as a result of which the receptacle 12 is accessible in this direction, and a clear width 14 of the guide 13 decreases toward the receptacle 12. As a result, the guide 13 tapers in this direction.

It should be noted that the body 2 in this design does not consist of a closed circumferential wall 3. Instead, it is implemented as a blank providing for multiple side pieces 28, which produce the body 2 when joined by a fastening element 29.

Figure 4:
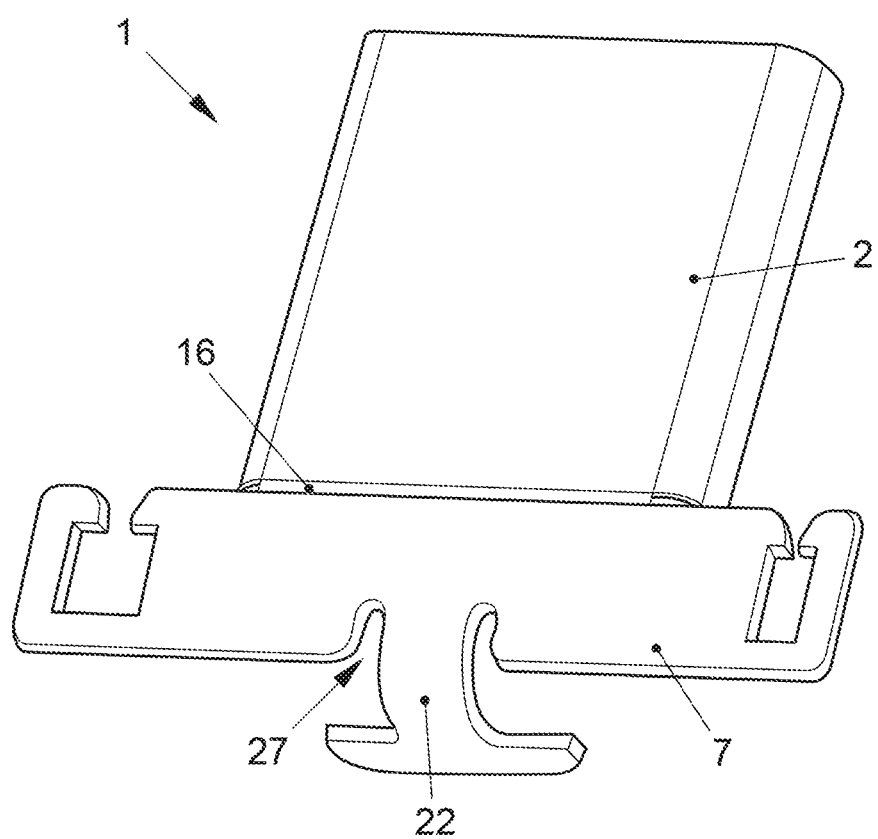
FIG. 4 shows the connection of the bracket to the body.

For completeness, FIG. 4 shows the connection of the bracket 7 to the body 2 of the cover 1 by a flexure bearing 16.

Also evident from FIG. 4 is the arrangement of the clamp base 22 in the recess 27 of the bracket 7, wherein this feature can be combined with all improvements of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cover for a strap of a seat belt for a vehicle for protecting the strap from mechanical influences, the cover comprising:
   a body that is designed such that the body has an aperture that is enclosed at least in sections by a wall, via which the cover is adapted to be arranged on the strap such that the wall of the body encloses at least sections of the strap in a circumferential direction of the body; and
   a bracket arranged on the wall of the body,
   wherein the bracket has at least one receptacle, and
   wherein the at least one receptacle perforates the bracket substantially perpendicular to a bracket plane.

2. The cover according to claim 1, wherein the bracket has an at least approximately rectangular, plate shape, wherein the thickness of the bracket is substantially perpendicular to a bracket plane.

3. The cover according to claim 2, wherein the approximately rectangular, plate shape bracket is elongated shape and has a longitudinal direction.

4. The cover according to claim 3, wherein the bracket is arranged on the body of the cover such that the longitudinal direction of the bracket is orthogonal to a center axis of the cover.

5. A cover for a strap of a seat belt for a vehicle for protecting the strap from mechanical influences, the cover comprising:
   a body that is designed such that the body has an aperture that is enclosed at least in sections by a wall, via which the cover is adapted to be arranged on the strap such that the wall of the body encloses at least sections of the strap in a circumferential direction of the body; and
   a bracket arranged on the wall of the body,
   wherein, in a longitudinal direction of the bracket, the bracket projects relative to the body, on both sides of a center axis of the cover, such that the bracket has a first projection and a second projection.

6. The cover according to claim 5, wherein the bracket has two receptacles, wherein one of the two receptacles is located in the first projection of the bracket and a second one of the two receptacles is located in the second projection of the bracket.

7. The cover according to claim 6, wherein surface areas of bases of the two receptacles introduced into the bracket differ from one another.

8. The cover according to claim 1, wherein the bracket is arranged at one end of the body.

9. The cover according to claim 1, wherein the cover is implemented as one piece.

10. The cover according to claim 1, wherein the cover is made of an elastomer.

11. The cover according to claim 1, wherein the bracket is connected to the body of the cover by a flexure bearing.

12. A cover for a strap of a seat belt for a vehicle for protecting the strap from mechanical influences, the cover comprising:
   a body that is designed such that the body has an aperture that is enclosed at least in sections by a wall, via which the cover is adapted to be arranged on the strap such that the wall of the body encloses at least sections of the strap in a circumferential direction of the body; and
   a bracket arranged on the wall of the body,
   wherein the bracket has at least one receptacle, and
   wherein a guide is located at the at least one receptacle of the bracket that perforates sections of the bracket in a direction that lies within a bracket plane, as a result of which the at least one receptacle is accessible in the direction that lies within the bracket plane.

13. The cover according to claim 12, wherein a clear width of the guide decreases toward the at least one receptacle, such that the guide is tapered.

* * * * *